US012547043B2

(12) United States Patent
Kim et al.

(10) Patent No.: US 12,547,043 B2
(45) Date of Patent: Feb. 10, 2026

(54) MACH-ZEHNDER INTERFEROMETRIC OPTICAL MODULATOR WITH SHALLOW RIDGE WAVEGUIDE STRUCTURE AND METHOD FOR MANUFACTURING THE SAME

(71) Applicant: Electronics and Telecommunications Research Institute, Daejeon (KR)

(72) Inventors: Hyun Soo Kim, Daejeon (KR); Ho Sung Kim, Daejeon (KR); Yongsoon Baek, Daejeon (KR); Won Seok Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 387 days.

(21) Appl. No.: 18/363,466

(22) Filed: Aug. 1, 2023

(65) Prior Publication Data

US 2024/0053652 A1 Feb. 15, 2024

(30) Foreign Application Priority Data

Aug. 9, 2022 (KR) .......................... 10-2022-0099034

(51) Int. Cl.
*G02F 1/225* (2006.01)
*G02F 1/025* (2006.01)

(52) U.S. Cl.
CPC .............. *G02F 1/225* (2013.01); *G02F 1/025* (2013.01); *G02F 1/2257* (2013.01)

(58) Field of Classification Search
CPC ......... G02F 1/225; G02F 1/2257; G02F 1/025
(Continued)

(56) References Cited

U.S. PATENT DOCUMENTS 6,521,476 B2 \* 2/2003 Kubota ................. H01S 5/2231
438/22
7,421,179 B1 9/2008 Jiang et al.
(Continued)

FOREIGN PATENT DOCUMENTS

JP 6458143 1/2019
JP 2022-37930 3/2022
(Continued)

OTHER PUBLICATIONS

Hoffmann et al., "45 Ghz Bandwidth Travelling Wave Electrode Mach-Zehnder Modulator With Integrated Spot Size Converter", IPRM, May 31, 2004, pp. 585-588.
(Continued)

*Primary Examiner* — Robert Tavlykaev
(74) *Attorney, Agent, or Firm* — KILE PARK REED & HOUTTEMAN PLLC

(57) ABSTRACT

Disclosed are a Mach-Zehnder interferometric optical modulator and a method for manufacturing the same. The modulator includes first and second lower clad layers stacked on a substrate, a core layer on the first and second lower clad layers, a first upper clad layer on the core layer, a second upper clad layer on the first upper clad layer, and electrodes on the second upper clad layer. The second upper clad layer includes an input waveguide, an output waveguide spaced apart from the input waveguide, branch waveguides branched from the input waveguide and coupled to the output waveguide, and insulating blocks provided on both outer sides of the branch waveguides.

15 Claims, 9 Drawing Sheets

(58) Field of Classification Search
USPC .......................................................... 385/1–3
See application file for complete search history.

(56) References Cited

U.S. PATENT DOCUMENTS

| | | | |
|---|---|---|---|
| 8,520,985 | B2 | 8/2013 | Park et al. |
| 9,304,335 | B2* | 4/2016 | Ellis-Monaghan ......................... H10D 62/158 |
| 10,254,624 | B2 | 4/2019 | Ogiso et al. |
| 12,072,600 | B2 | 8/2024 | Kim et al. |
| 2015/0331298 | A1* | 11/2015 | Yagi ...................... G02F 1/2257 385/2 |
| 2017/0168371 | A1 | 6/2017 | Kim et al. |
| 2020/0124878 | A1 | 4/2020 | Yu et al. |
| 2020/0183197 | A1* | 6/2020 | Liu ......................... G02B 6/122 |
| 2021/0088866 | A1 | 3/2021 | Kim et al. |
| 2022/0066280 | A1 | 3/2022 | Kono |

FOREIGN PATENT DOCUMENTS

| | | |
|---|---|---|
| KR | 10-1070409 | 10/2011 |
| KR | 10-2017-0071074 | 6/2017 |
| KR | 10-2023-0036654 | 3/2023 |

OTHER PUBLICATIONS

Prosyk et al., "High Performance 40GHz InP Mach-Zehnder Modulator", OFC/NFOEC Technical Digest, 2012, 3 total pages.

Ogiso et al., "Over 67 GHz Bandwidth and 1.5 V Vπ InP-Based Optical IQ Modulator With n-i-p-n Heterostructure", Journal of Lightwave Technology, Apr. 15, 2017, pp. 1450-1455, vol. 35, No. 8.

* cited by examiner

MACH-ZEHNDER INTERFEROMETRIC OPTICAL MODULATOR WITH SHALLOW RIDGE WAVEGUIDE STRUCTURE AND METHOD FOR MANUFACTURING THE SAME

CROSS-REFERENCE TO RELATED APPLICATIONS

This U.S. non-provisional patent application claims priority under 35 U.S.C. § 119 of Korean Patent Application No. 10-2022-0099034, filed on Aug. 9, 2022, the entire contents of which are hereby incorporated by reference.

BACKGROUND

The present disclosure herein relates to an optical modulator and a method for manufacturing the same, and more particularly, to a Mach-Zehnder interferometric optical modulator with a shallow ridge waveguide structure and a method for manufacturing the same.

Recently, with the advent of high-speed Internet and various multimedia services, the volume of global information is expected to increase exponentially. However, profits of network operators are expected to be stagnant, and there is an urgent need to secure optical component technology for achieving high speed, flexibility, small size, and low price of a system in addition to efficiency of network resources. Furthermore, it is required to develop an optical modulator having an ultrahigh transmission speed that may overcome physical and economic limitations of Internet traffic.

SUMMARY

The present disclosure provides a Mach-Zehnder interferometric optical modulator capable of reducing leakage current generated in active waveguides and a method for manufacturing the same.

The present disclosure provides a Mach-Zehnder interferometric optical modulator. The modulator includes: first and second lower clad layers stacked on a substrate; a core layer on the first and second lower clad layers; a first upper clad layer on the core layer; a second upper clad layer on the first upper clad layer; and electrodes on the second upper clad layer. Here, the second upper clad layer may include: an input waveguide; an output waveguide spaced apart from the input waveguide; branch waveguides branched from the input waveguide and coupled to the output waveguide; and insulating blocks provided on both outer sides of the branch waveguides. Each of the branch waveguides may include: active waveguides under the electrodes; and passive waveguides connected between the active waveguides and exposed from the electrodes. The insulating blocks may be provided on both outer sides of the active waveguides.

The insulating blocks may include the same material as the passive waveguides.

According to an example, the insulating blocks and the passive waveguides may include intrinsic InP.

According to an example, the insulating blocks and the passive waveguides may include semi-insulated doped InP.

According to an example, the active waveguides may include conductive doped InP.

According to an example, the first upper clad layer may include conductive doped InP.

According to an example, the first lower clad layer and the second lower clad layer may include conductive doped InP.

According to an example, the core layer may include InGaAsP or InAlGaAs.

According to an example, the Mach-Zehnder interferometric optical modulator may further include an etching stop layer between the first upper clad layer and the second upper clad layer, wherein the etching stop layer may include InGaAsP, InAlAs, or InGaAlAs.

According to an example, the Mach-Zehnder interferometric optical modulator may further include a passivation layer provided on the etching stop layer outside the second upper clad layer.

In an embodiment of the inventive concept, a method for manufacturing a Mach-Zehnder interferometric optical modulator includes: forming first and second lower clad layers on a substrate; forming a core layer on the first and second lower clad layers; forming a first upper clad layer on the core layer; forming a second upper clad layer on the first upper clad layer; and forming electrodes on the second upper clad layer. Here, the forming of the second upper clad layer may include: forming an active layer; forming a passive layer outside the active layer; and patterning the active layer and the passive layer to form active waveguides, passive waveguides between the active waveguides, and insulating blocks on both outer sides of the active waveguides by patterning.

According to an example, the active waveguides may include conductive doped InP, and the passive waveguides and the insulating blocks may include intrinsic InP or semi-insulated doped InP.

According to an example, the second upper clad layer may include: an input waveguide; an output waveguide spaced apart from the input waveguide; branch waveguides branched from the input waveguide and coupled to the output waveguide; and the insulating blocks provided on both outer sides of the branch waveguides.

According to an example, each of the branch waveguides may include: the active waveguides between the insulating blocks; and the passive waveguides between the active waveguides.

According to an example, the method may further include forming an etching stop layer between the first upper clad layer and the second upper clad layer.

According to an example, the active waveguides, the passive waveguides, and the insulating blocks may have a cross-section of a reverse mesa structure.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
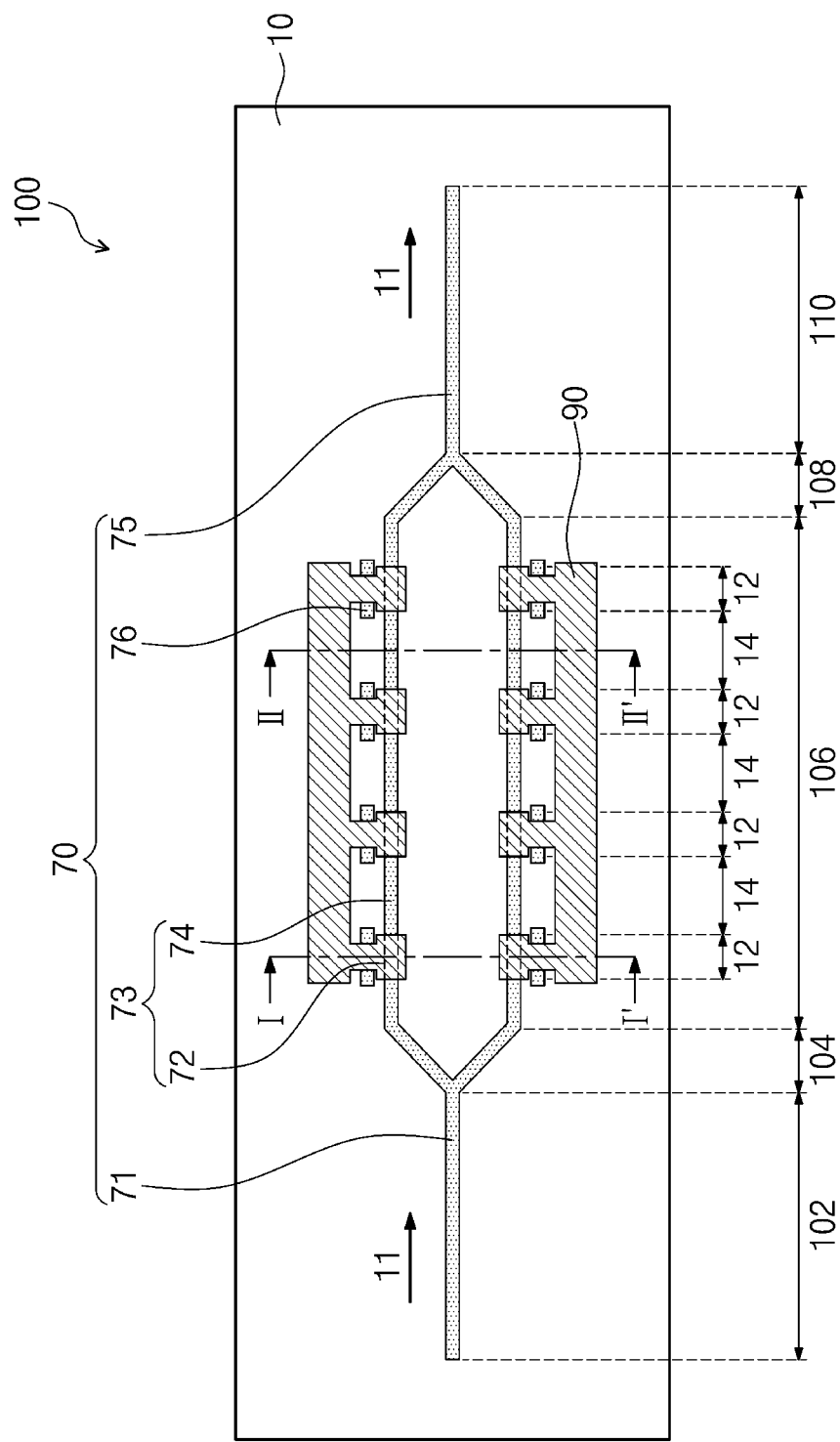
FIG. 1 is a plan view illustrating an example of a Mach-Zehnder interferometric optical modulator according to an embodiment of the inventive concept.

Embodiments of the inventive concept will now be described in detail with reference to the accompanying drawings. The advantages and features of embodiments of the inventive concept, and methods for achieving the advantages and features will be apparent from the embodiments described in detail below with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout.

The terminology used herein is not for delimiting the embodiments of the inventive concept but for describing the embodiments of the inventive concept. The terms of a singular form may include plural forms unless otherwise specified. It will be further understood that the terms "include", "including", "comprise", and/or "comprising" used herein specify the presence of stated elements, steps, operations, and/or devices, but do not preclude the presence or addition of one or more other elements, steps, operations, and/or devices. Furthermore, the terms "clad", "core", "waveguide", and "phase shift region" may be construed as meaning those commonly used in the field of optical communications. Reference numerals, which are presented in the order of description, are provided according to the embodiments and are thus not necessarily limited to the order.

Figure 2:
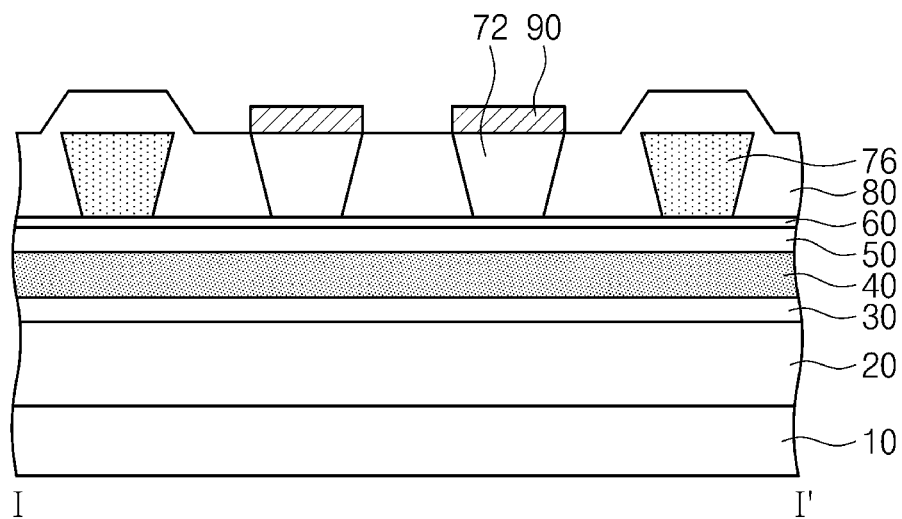
FIG. 2 is a cross-sectional view taken along line I-I' of FIG. 1.
Figure 3:
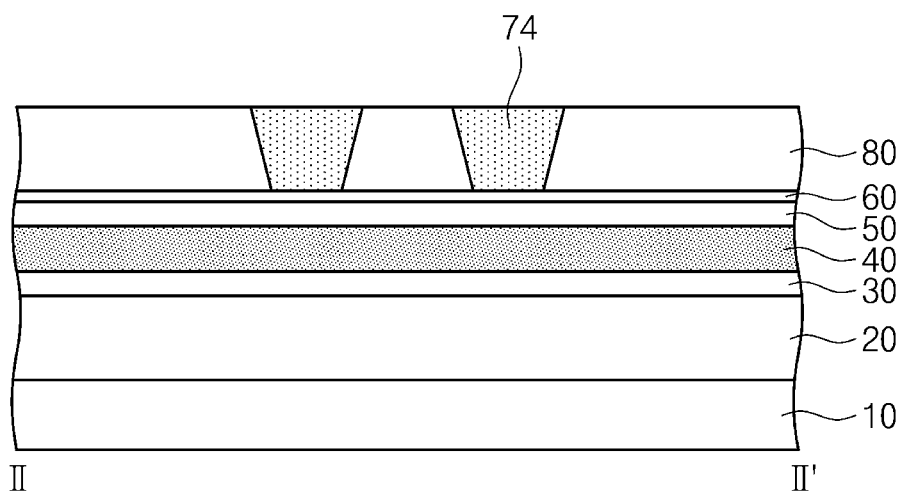
FIG. 3 is a cross-sectional view taken along line II-II' of FIG. 1.

FIG. 1 illustrates an example of a Mach-Zehnder interferometric optical modulator 100 according to an embodiment of the inventive concept. FIG. 2 is a cross-sectional view taken along line I-I' of FIG. 1. FIG. 3 is a cross-sectional view taken along line II-II' of FIG. 1.

Referring to FIGS. 1 to 3, the Mach-Zehnder interferometric optical modulator 100 of an embodiment of the inventive concept may be a Mach-Zehnder interference modulator with a reverse mesa-type shallow ridge waveguide structure. Alternatively, the Mach-Zehnder interferometric optical modulator 100 may be a Mach-Zehnder interferometric optical modulator with a mesa structure, but an embodiment of the inventive concept is not limited thereto. According to an embodiment, the Mach-Zehnder interferometric optical modulator 100 of an embodiment of the inventive concept may include a substrate 10, a first lower clad layer 20, a second lower clad layer 30, a core layer 40, a first upper clad layer 50, an etching stop layer 60, a second upper clad layer 70, a passivation layer 80, and electrodes 90.

The substrate 10 may be planar. For example, the substrate 10 may include a silicon wafer. Alternatively, the substrate 10 may include a glass substrate or a group III-V semiconductor substrate, but an embodiment of the inventive concept is not limited thereto. According to an example, the substrate 10 may include an input region 102, a dividing region 104, a phase shifting region 106, a coupling region 108, and an output region 110. The input region 102 may be a region for receiving light 11. The dividing region 104 may be a region for dividing the light 11. The phase shifting region 106 may be a region for changing a phase of the light 11. According to an example, the phase shifting region 106 may include active regions 12 and passive regions 14. The active regions 12 may be provided below electrodes 90. The active regions 12 may be regions for modulating the phase of the light 11. The passive regions 14 may be provided between the electrodes 90. The passive regions 14 may be regions for transferring and/or transmitting light. The coupling region 108 may be a region for causing the light 11 to interfere. The output region 110 may be a region for transferring the light to the outside.

The first lower clad layer 20 may be provided on the substrate 10. The first lower clad layer 20 may include conductive doped InP. For example, the first lower clad layer 20 may include n-type doped InP.

The second lower clad layer 30 may be provided on the first lower clad layer 20. The second lower clad layer 30 may include conductive doped InP. The second lower clad layer 30 may include n-type doped InP. A doping concentration of the second lower clad layer 30 may be lower than a doping concentration of the first lower clad layer 20.

The core layer 40 may be provided on the second lower clad layer 30. The core layer 40 may have a refractive index higher than refractive indices of the first lower clad layer 20 and the second lower clad layer 30. The core layer 40 may include InGaAsP. Alternatively, the core layer 40 may include InAlGaAs, but an embodiment of the inventive concept is not limited thereto.

The first upper clad layer 50 may be provided on the core layer 40. The first upper clad layer 50 may have a refractive index lower than the refractive index of the core layer 40. The first upper clad layer 50 may include conductive doped InP. For example, the first upper clad layer 50 may include p-type doped InP.

The etching stop layer 60 may be provided on the first upper clad layer 50. The etching stop layer 60 may include InGaAsP, InAlAs, or InGaAlAs, but an embodiment of the inventive concept is not limited thereto.

The second upper clad layer 70 may be provided on the etching stop layer 60. The second upper clad layer 70 may be a ridge waveguide layer that transfers the light 11 along the core layer 40. The second upper clad layer 70 of a ridge waveguide layer may minimize and/or reduce current leakage that occurs in a sidewall of a typical mesa waveguide. According to an example, the second upper clad layer 70 may include an input waveguide 71, an output waveguide 75, branch waveguides 73, and insulating blocks 76.

The input waveguide 71 may be connected to one side of the branch waveguides 73. The input waveguide 71 may receive the light 11. The input waveguide 71 may include semi-insulated doped InP. For example, the input waveguide 71 may include intrinsic InP. Although not illustrated, a waveguide divider may be provided between the input waveguide 71 and the branch waveguides 73. The waveguide divider may receive the light 11 in the input waveguide 71 and distribute the light 11 to the branch waveguides 73.

The output waveguide 75 may be connected to another side of the branch waveguides 73. The output waveguide 75 may transfer the light 11 to the outside. The output waveguide 75 may include semi-insulated doped InP. For example, the output waveguide 75 may include intrinsic InP. Although not illustrated, a waveguide combiner may be provided between the output waveguide 75 and the branch waveguides 73. The waveguide combiner may cause the light 11 to interfere. The light 11 may be amplified by constructive interference and dissipated by destructive interference.

The branch waveguides 73 may be branched from the input waveguide 71 and may be coupled to the output waveguide 75. The branch waveguides 73 may be parallel with each other. Each of the branch waveguides 73 may control the phase of the light 11 using an electric field provided by the electrodes 90. The branch waveguides 73 may have a cross-section of a reverse mesa structure. According to an example, each of the branch waveguides 73 may include active waveguides 72 and passive waveguides 74.

The active waveguides 72 may be provided in the active regions 12 of the substrate 10. The active waveguides 72 may be provided under the electrodes 90. The active waveguides 72 may be phase modulation waveguides. The active waveguides 72 may be reverse mesa-type shallow ridge waveguides or vertical mesa-type shallow ridge waveguides, but an embodiment of the inventive concept is not limited thereto. The active waveguides 72 may control the phase of the light 11 using an electric field between the electrodes 90 and the substrate 10. The active waveguides 72 may include conductive doped InP. For example, the active waveguides 72 may include p-type doped InP.

The passive waveguides 74 may be provided in the passive region 14 of the substrate 10. The passive waveguides 74 may be provided between the active waveguides 72. The passive waveguides 74 may insulate the active waveguides 72. The passive waveguides 74 may include semi-insulated doped InP. For example, the passive waveguides 74 may include intrinsic InP.

The insulating blocks 76 may be provided on both outer sides of the active waveguides 72. The insulating blocks 76 may be parallel with the active waveguides 72. The insulating blocks 76 may be connected in a parallel direction to the active waveguides 72, but an embodiment of the inventive concept is not limited thereto. The insulating blocks 76 may have a cross-section of a reverse mesa structure. The insulating blocks 76 may be provided below the electrodes 90. The insulating blocks 76 may reduce leakage current generated in the active waveguides 72 and having a direction intersecting with a travel direction of the light 11. The insulating blocks 76 may have the same material as the passive waveguides 74. For example, the insulating blocks 76 may include intrinsic InP or semi-insulated doped InP. The insulating blocks 76 may be spaced about 3 m or more apart from the active waveguides 72.

Therefore, the Mach-Zehnder interferometric optical modulator 100 of an embodiment of the inventive concept may reduce leakage current of the active waveguides 72 using the insulating blocks 76.

The passivation layer 80 may be provided on a sidewall of the branch waveguides 73. The passivation layer 80 may be provided on the insulating blocks 76. The passivation layer 80 may protect the branch waveguides 73 and the insulating blocks 76. Although not illustrated, the passivation layer 80 may be provided on sidewalls or upper portions of the input waveguide 71 and the output waveguide 75.

The electrodes 90 may be provided on the active waveguides 72. The electrodes 90 may be provided on the passivation layer 80. The electrodes 90 may modulate the phase of the light 11 by applying an electric field into the active waveguides 72 using external power.

A method for manufacturing the Mach-Zehnder interferometric optical modulator 100 configured as described above is described below.

Figure 4:
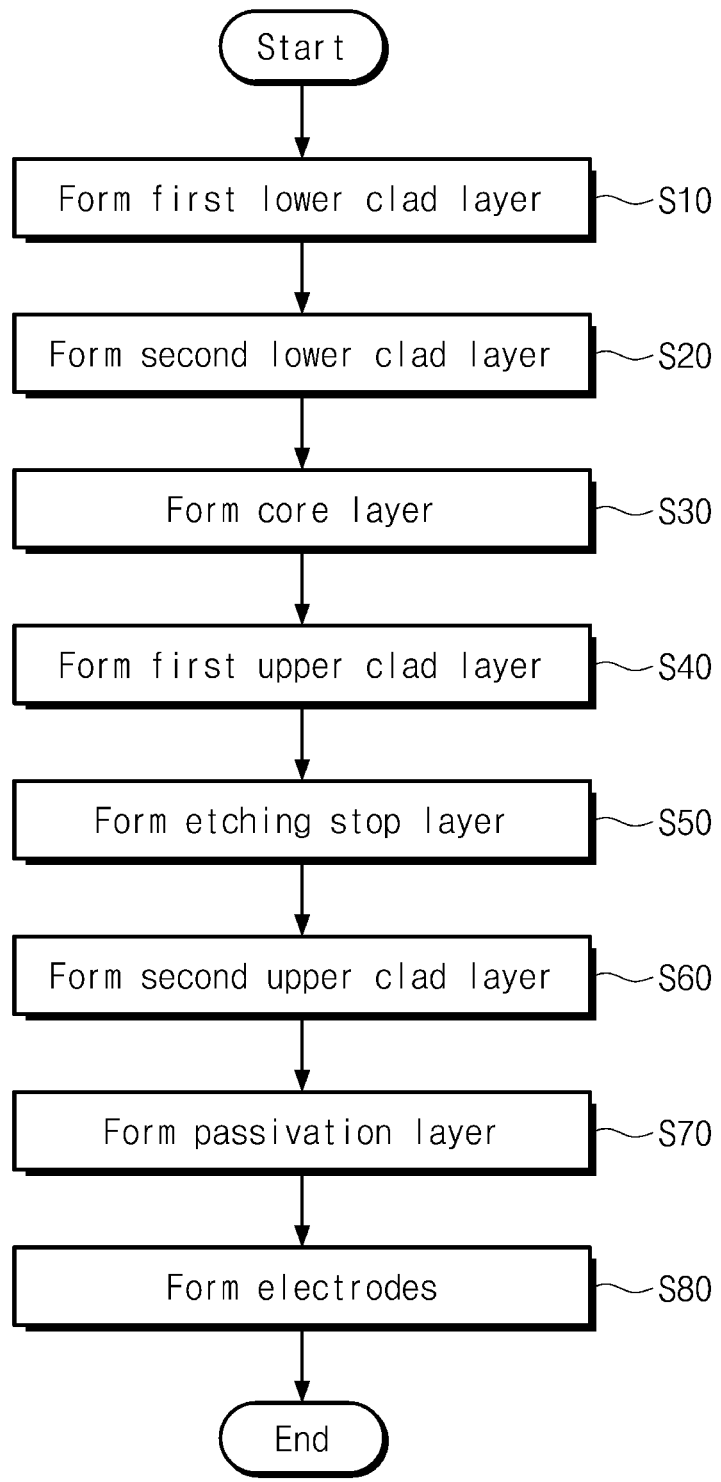
FIG. 4 is a flowchart illustrating a method for manufacturing a Mach-Zehnder interferometric optical modulator of an embodiment of the inventive concept.

FIG. 4 illustrates a method for manufacturing the Mach-Zehnder interferometric optical modulator 100 of an embodiment of the inventive concept. FIGS. 5A to 5D are cross-sectional views illustrating a manufacturing process of the active waveguides 72 and the insulating blocks 76 of FIG. 2. FIGS. 6A to 6D are cross-sectional views illustrating a manufacturing process of the passive waveguides 74 of FIG. 3.

Figure 5A:
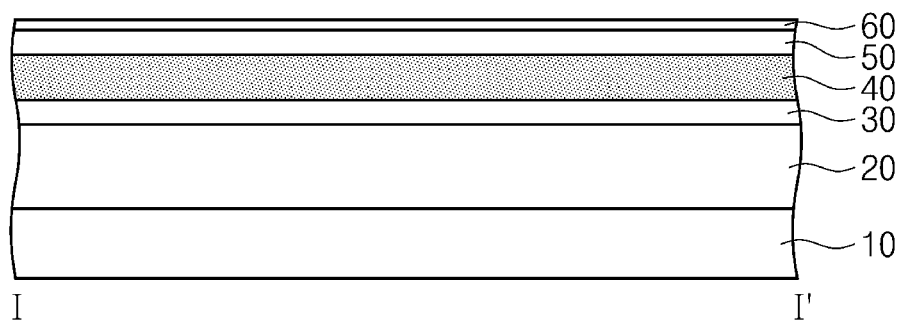
FIGS. 5A to 5D are cross-sectional views illustrating a manufacturing process of the active waveguides and the insulating blocks of FIG. 2.
Figure 5B:
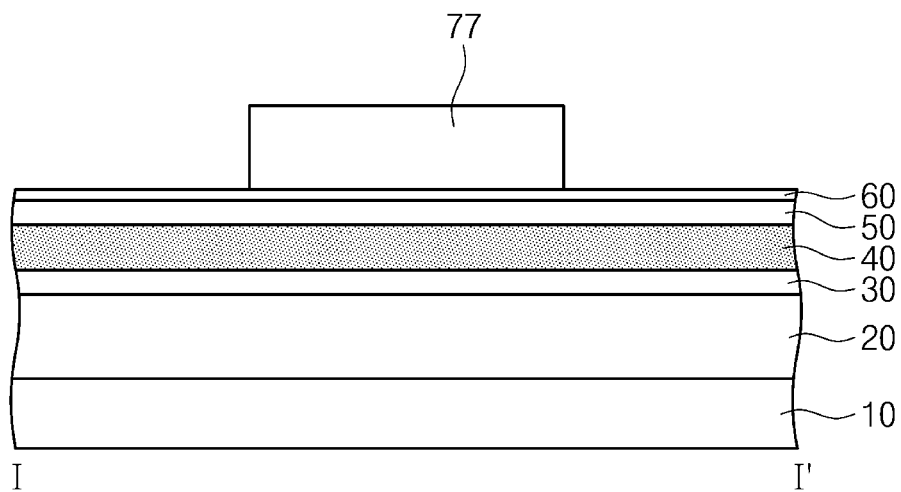
Figure 5C:
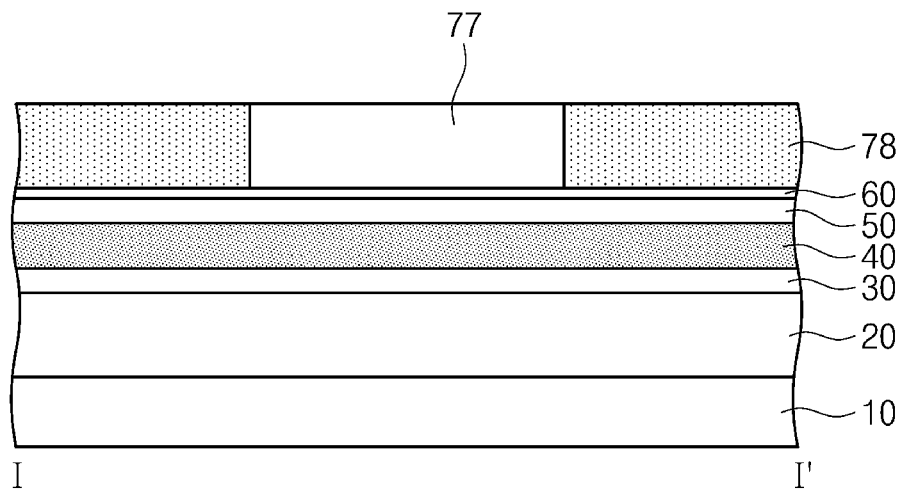
Figure 5D:
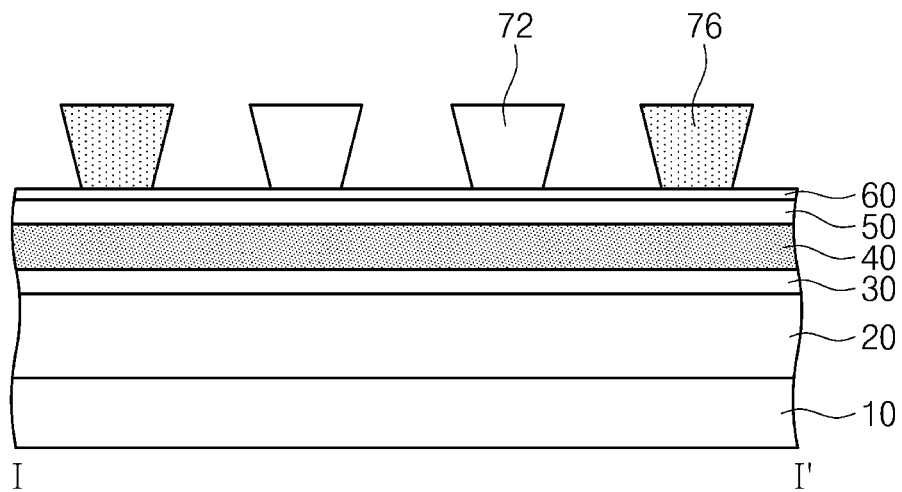
Figure 6A:
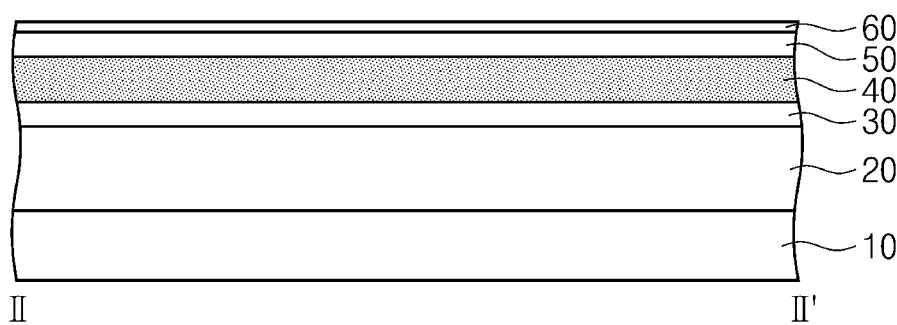
FIGS. 6A to 6D are cross-sectional views illustrating a manufacturing process of the passive waveguides of FIG. 3.
Figure 6B:
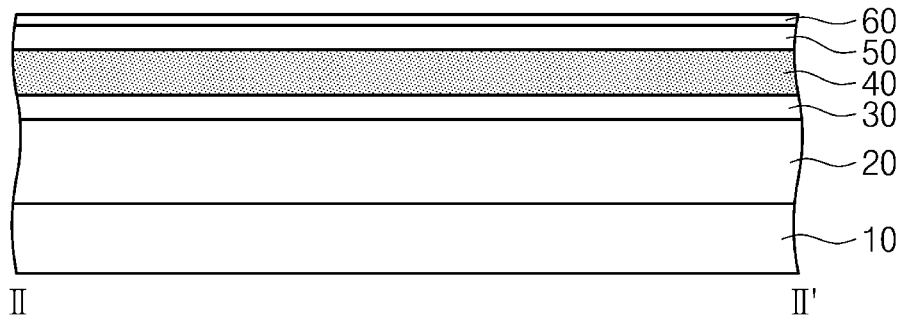
Figure 6C:
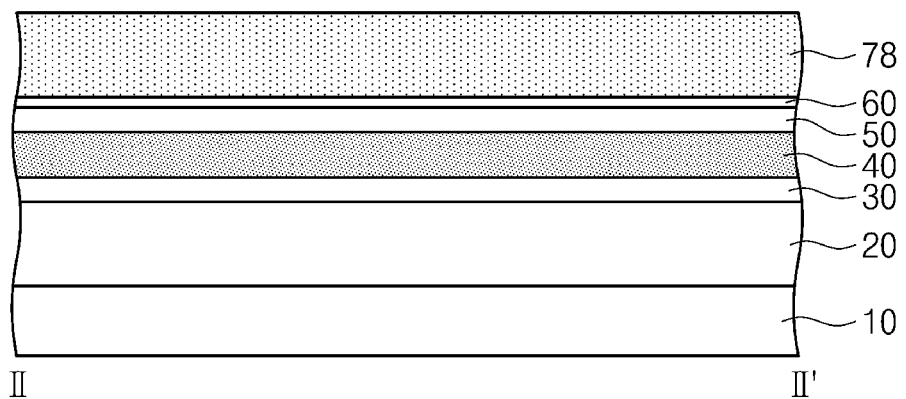
Figure 6D:
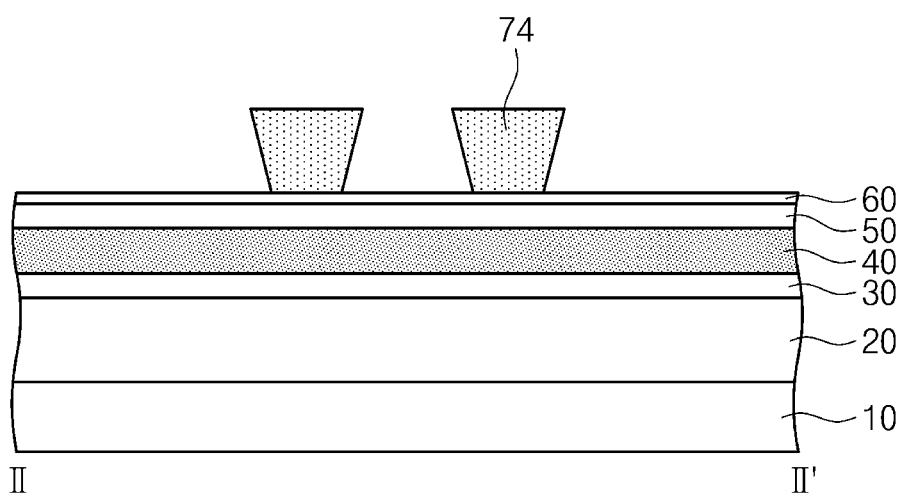

Referring to FIGS. 4, 5A, and 6A, the first lower clad layer 20 is formed on the substrate 10 (S10). The first lower clad layer 20 may include n-type doped InP formed using a molecular beam epitaxy (MBE) method or metal-organic vapor phase epitaxy (MOVPE) method.

Next, the second lower clad layer 30 is formed on the first lower clad layer 20 (S20). The second lower clad layer 30 may include intrinsic InP formed using a metal-organic vapor phase epitaxy method.

Next, the core layer 40 is formed on the second lower clad layer 30 (S30). The core layer 40 may include InGaAs formed using a metal-organic vapor phase epitaxy method.

Thereafter, the first upper clad layer 50 is formed on the core layer 40 (S40). The first upper clad layer 50 may include intrinsic InP formed using a metal-organic vapor phase epitaxy method.

Furthermore, the etching stop layer 60 is formed on the first upper clad layer 50 (S50). The etching stop layer 60 may include InGaAsP, InAlAs, or InGaAlAs formed using a metal-organic vapor phase epitaxy method.

Referring to FIGS. 1, 4, 5A, and 6A, the second upper clad layer 70 is formed on the etching stop layer 60 (S60). The first lower clad layer 20, the second lower clad layer 30, the core layer 40, the first upper clad layer 50, and the etching stop layer 60 may be formed in situ in one chamber (not shown), but an embodiment of the inventive concept is not limited thereto.

Figure 7:
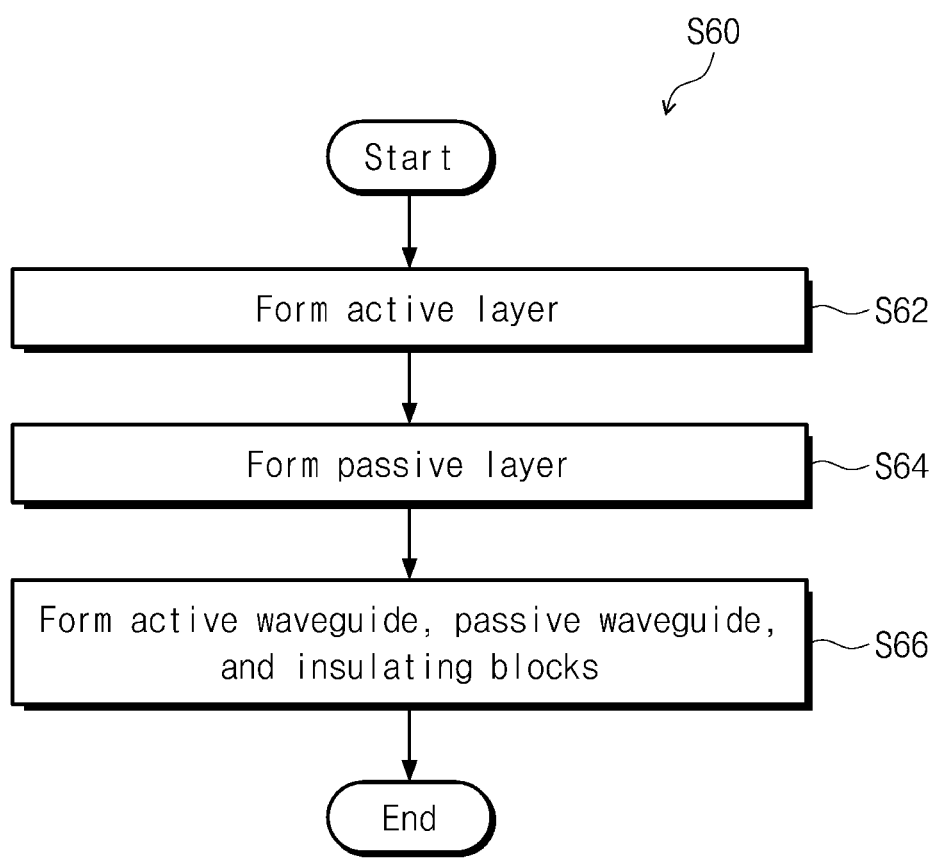
FIG. 7 is a flowchart illustrating an example of forming the second upper clad layer of FIG. 1.

FIG. 7 illustrates an example of forming (S60) the second upper clad layer 70 of FIG. 1.

Referring to FIGS. 1, 5B, 6B, and 7, an active layer 77 is formed on the etching stop layer 60 (S62). The active layer 77 may include p-type doped InP. The active layer 77 may be formed in the active regions 12. Alternatively, the active layer 77 may be formed in the input region 102, the dividing region 104, the coupling region 108, and the output region 110, but an embodiment of the inventive concept is not limited thereto.

Referring to FIGS. 1, 5C, 6C, and 7, a passive layer 78 is formed on the etching stop layer 60 exposed by the active layer 77 (S64). The passive layer 78 may include intrinsic InP or semi-insulated doped InP.

Figure 8:
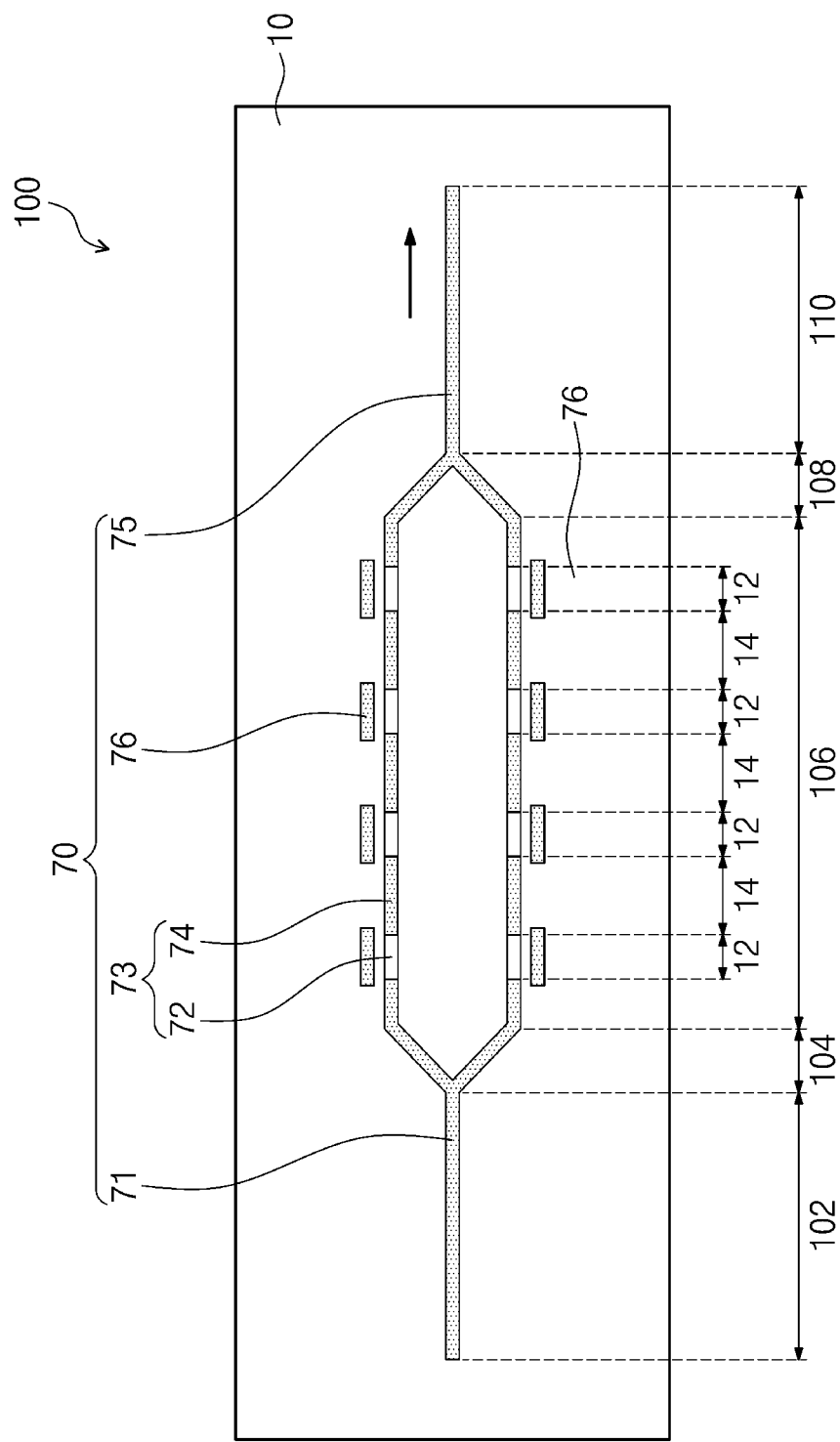
FIG. 8 is a plan view illustrating an example of the active waveguides, the passive waveguides, and the insulating blocks of FIG. 1.

FIG. 8 illustrates an example of the active waveguides 72, the passive waveguides 74, and the insulating blocks 76 of FIG. 1.

Referring to FIGS. 5D, 6D, 7, and 8, the active waveguides 72, the passive waveguides 74, and the insulating blocks 76 are formed by patterning the active layer 77 and the passive layer 78 (S66). The active waveguides 72, the passive waveguides 74, and the insulating blocks 76 may have a cross-section of a reverse mesa structure. The insulating blocks 76 may be spaced about 3 m or more apart from the active waveguides 72.

Referring back to FIGS. 1 to 4, the passivation layer 80 is formed (S70). The passivation layer 80 may include a silicon oxide film or silicon nitride formed using a chemical vapor deposition method. Alternatively, the passivation layer 80 may include a polymer formed using spin coating or a sol-gel method, but an embodiment of the inventive concept is not limited thereto.

Furthermore, the electrodes 90 are formed on the active waveguides 72 and a portion of the passivation layer 80 (S80). The electrodes 90 may include metal formed through a deposition process, a photolithography process, and an etching process. For example, the electrodes 90 may include at least one of gold (Au), silver (Ag), copper (Cu), aluminum (Al), titanium (Ti), tungsten (W), or tantalum (Ta), but an embodiment of the inventive concept is not limited thereto.

As described above, the Mach-Zehnder interferometric optical modulator and the method for manufacturing the same according to an embodiment of the inventive concept may reduce leakage current of active waveguides by providing, on both outer sides of the active waveguides, insulating blocks having the same material as passive waveguides between the active waveguides.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A Mach-Zehnder interferometric optical modulator comprising:
    first and second lower clad layers stacked on a substrate;
    a core layer on the first and second lower clad layers;
    a first upper clad layer on the core layer;
    a second upper clad layer on the first upper clad layer; and
    electrodes on the second upper clad layer,
    wherein the second upper clad layer includes:
    an input waveguide;
    an output waveguide spaced apart from the input waveguide;
    branch waveguides branched from the input waveguide and coupled to the output waveguide; and
    insulating blocks provided on both outer sides of the branch waveguides,
    wherein each of the branch waveguides includes:
    active waveguides under the electrodes; and
    passive waveguides connected between the active waveguides and exposed from the electrodes,
    wherein the insulating blocks are provided on both outer sides of the active waveguides, and
    wherein the insulating blocks and the passive waveguides are formed from a same layer of material.

2. The Mach-Zehnder interferometric optical modulator of claim 1, wherein the insulating blocks and the passive waveguides include intrinsic InP.

3. The Mach-Zehnder interferometric optical modulator of claim 1, wherein the insulating blocks and the passive waveguides include semi-insulated doped InP.

4. The Mach-Zehnder interferometric optical modulator of claim 1, wherein the active waveguides include conductive doped InP.

5. The Mach-Zehnder interferometric optical modulator of claim 1, wherein the first upper clad layer includes conductive doped InP.

6. The Mach-Zehnder interferometric optical modulator of claim 1, wherein the first lower clad layer and the second lower clad layer include conductive doped InP.

7. The Mach-Zehnder interferometric optical modulator of claim 1, wherein the core layer includes InGaAsP or InAlGaAs.

8. The Mach-Zehnder interferometric optical modulator of claim 1, further comprising
    an etching stop layer between the first upper clad layer and the second upper clad layer,
    wherein the etching stop layer includes InGaAsP, InAlAs, or InGaAlAs.

9. The Mach-Zehnder interferometric optical modulator of claim 8, further comprising a passivation layer provided on the etching stop layer outside the second upper clad layer.

10. A method for manufacturing a Mach-Zehnder interferometric optical modulator, comprising:
    forming first and second lower clad layers on a substrate;
    forming a core layer on the first and second lower clad layers;
    forming a first upper clad layer on the core layer;
    forming a second upper clad layer on the first upper clad layer; and
    forming electrodes on the second upper clad layer,
    wherein the forming of the second upper clad layer includes:
    forming an active layer;
    forming a passive layer outside the active layer;
    patterning the active layer to form active waveguides, and
    patterning the passive layer to form passive waveguides between the active waveguides, and insulating blocks on both outer sides of the active waveguides.

11. The method of claim 10,
    wherein the active waveguides include conductive doped InP, and
    the passive waveguides and the insulating blocks include intrinsic InP or semi-insulated doped InP.

12. The method of claim 10, wherein the second upper clad layer includes:
    an input waveguide;
    an output waveguide spaced apart from the input waveguide;
    branch waveguides branched from the input waveguide and coupled to the output waveguide; and
    the insulating blocks provided on both outer sides of the branch waveguides.

13. The method of claim 12, wherein each of the branch waveguides includes:
    the active waveguides between the insulating blocks; and
    the passive waveguides between the active waveguides.

14. The method of claim 10, further comprising forming an etching stop layer between the first upper clad layer and the second upper clad layer.

15. The method of claim 10, wherein the active waveguides, the passive waveguides, and the insulating blocks have a cross-section of a reverse mesa structure.

* * * * *